Sept. 22, 1970  A. SCHWARZKOPF  3,529,317
HANDLE OF SYNTHETIC THERMOPLASTIC
MATERIAL FOR CARRYING BAGS
Filed Oct. 30, 1968
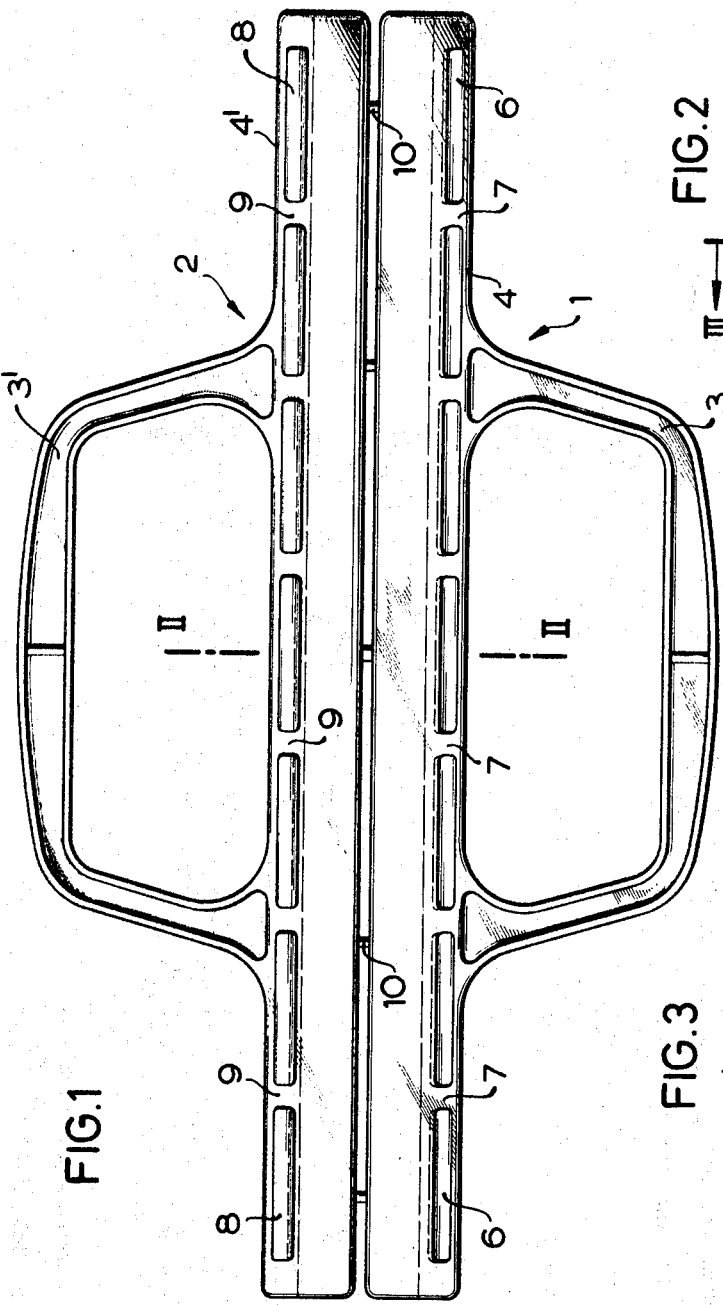
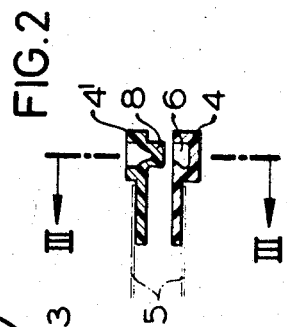
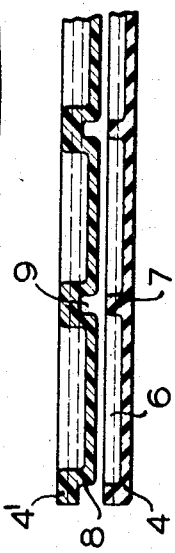
INVENTOR
August SCHWARZKOPF
By
*Stevens, Davis, Miller & Mosher*
his ATTORNEYS //
United States Patent Office 3,529,317
Patented Sept. 22, 1970

3,529,317
HANDLE OF SYNTHETIC THERMOPLASTIC MATERIAL FOR CARRYING BAGS
August Schwarzkopf, Lengerich, Westphalia, Germany, assignor to Windmöller & Hölscher, Lengerich, Westphalia, Germany
Filed Oct. 30, 1968, Ser. No. 771,910
Claims priority, application Germany, Nov. 3, 1967, 1,632,564
Int. Cl. A45c *13/26;* B65d *33/24*
U.S. Cl. 16—110                                              1 Claim

ABSTRACT OF THE DISCLOSURE

Two handle parts abut in use and comprise each a carrying loop and a joining strip to be joined, preferably by heat sealing, to the associated bag wall. The handle parts are detachably interconnected by a fastening rib, which is formed on one handle part and extends over the length of the joining strip, and a groove which is formed in the other handle part and complementary to the fastening rib. The walls of the groove are interconnected by a plurality of transverse webs. The fastening rib has apertures which correspond to said transverse webs.

---

This invention relates to a handle for carrying bags, which handle is made from synthetic thermoplastic material and comprises two handle parts, which abut in use and comprise each a carying loop and a joining strip to be joined, preferably by heat sealing, to the associated bag wall, said handle parts being detachably interconnected by a fastening rib, which is formed on one handle part and extends over the length of the joining strip, and a groove which is formed in the other handle part and complementary to the fastening rib.

In known handles of this kind for carrying bags (French patent specification 1,296,741), the groove extends continuously throughout the length of the joining strip of one carrying handle part and the fastening rib intended to be received by the groove and conforming to the inwardly flaring, e.g., dovetail cross-section of the latter extends throughout the joining strip of the other carrying handle part. Whereas this striplike joining element results in a tight closure of the opening of the carrying bag, the long groove lacks at its longitudinal sides the transverse stress which is required for a reliable retention of the fastening rib so that when the carrying bag is filled the fastening rib tends to slip out of the long groove and the carrying bag then opens spontaneously, although this is not desired. Besides, an exact insertion of the fastening rib into its groove is difficult when the carrying bag is filled. For instance, if the user does not hold the ends of the joining strips in alignment when the fastening rib is inserted into the groove the opening of the carrying bag can be closed only in part and the weight of the filled bag tends to expand those ends of the joining strips which are not closed so that an undesired opening of the carrying bag results.

In a modification of the known carrying handle which has been described hereinbefore, one-half of the fastening rib and one-half of the groove are formed in the joining strip of each carrying handle part (German Utility Model 1,947,056). As a result, the two carrying handle parts are identical and may be made in one and the same mold. On the other hand, the above-mentioned drawbacks are not eliminated. The fastening ribs and grooves are terminated at a distance from the vertical center line so that the fastening ribs of the two carrying handle halves cannot contact each other. This fact increases the possibility of a misalignment of the two carrying handle parts during the closing of the handle and the resulting danger of an unintended opening.

It is an object of the invention to provide a handle of the kind described first hereinabove for carrying bags so as to maintain a tight closure and to improve the retention of the fastening rib in the groove in such a manner that the unintended opening of the bag will be reliably avoided even when the carrying bag is filled and the closing operation with the ends of the joining strips in alignment is facilitated.

This object is accomplished according to the invention in that the walls of the groove are interconnected by a plurality of transverse webs and the fastening rib has apertures which correspond to said transverse webs. The transverse webs support the long side walls of the groove against the expanding forces which occur as the fastening rib is forced into the groove. The transverse webs also increase the transverse stress which is exerted on the fastening rib so that the latter is held in the groove so firmly that the opening of the carrying bag will be reliably closed even when the carrying bag is filled.

An embodiment of the handle according to the invention for a carrying bag is shown by way of example on the drawing, in which FIG. 1 shows the carrying handle parts in a top plan view on the surfaces which face each other during the the closing operation, FIG. 2 is a sectional view taken on line II—II of FIG. 1 and showing the confronting carrying handle parts ready for the closing operation, and FIG. 3 is a sectional view taken on line III—III in FIG. 2.

The handle according to the invention for a carrying bag consists of the two carrying handle parts 1 and 2, which in FIG. 1 are shown in the condition in which they leave the injection molding machine for plastics material. The illustration represents those surfaces of the carrying handle parts which face each other as shown in FIGS. 2 and 3 to form the carrying handle. Each carrying handle consists of the carrying loop 3, 3' and the joining strip 4, 4', by which the handle part is secured to the bag wall 5 adjacent to the bag opening by heat sealing, adhering or different methods. The joining strip 4 of the handle part 1 is formed with a groove 6, which extends almost throughout the length of said strip and has an inwardly flaring cross-section shown in FIG. 2. According to the invention, the walls of the groove are interconnected by a plurality of transverse webs 7. The handle part 2 comprises a fastening rib 8, which is formed on the joining strip 4' and associated with the groove 6. The fastening rib 8 has a head having a sectional shape corresponding to that of the groove 6 (see FIG. 2) and is formed with apertures 9 corresponding to the transverse webs 7 in the groove 6.

The transverse webs 7 and the apertures 9 control exactly the relative longitudinal position of the carrying handle parts in which the head of the fastening rib 8 is freely received by the groove 6. The parts will be in this position if only a single portion of the fastening rib is received by the corresponding groove portion because the correspondence of the groove portions with the associated portions of the fastening ribs ensures that the fitting of a single fastening rib portion prevents any relative displacement and twisting of the two carrying handle parts 1, 2. For this reason, the fastening elements 6 and 8 can be easily and reliably closed even when the carrying bag is filled.

Because the handle of the carrying bag consists of two different carrying handle parts, the mold for injection molding the pair of carrying handles is suitably designed so that the two parts 1, 2 of the carrying handle are held together at the edges of their joining strips in known manner by narrow webs 10. In this case the carrying handle parts can be folded one against the other about the webs 10, which act like hinges, so that the fastening rib 8 is exactly opposite to the groove 6. When the fastening rib is then forced into the groove, the two parts of the carrying handle will assume their closed position, in which they are joined to the walls 5 of the carrying bag, e.g., by heat sealing. When the carrying bag is opened for the first time, the weak webs 10 are ruptured without difficulty.

What is claimed is:

1. A handle for carrying bags, which handle is made from synthetic thermoplastic material and comprises two handle parts, which abut in use and comprise each a carrying loop and a joining strip to be joined, preferably by heat sealing, to the associated bag wall, said handle parts being detachably interconnected by a fastening rib, which is formed on one handle part and extends over the length of the joining strip, and a groove which is formed in the other handle part and complementary to the fastening rib, characterized in that the walls of the groove are interconnected by a plurality of transverse webs (7) and the fastening rib (8) has apertures (9) which correspond to said transverse webs.

References Cited

UNITED STATES PATENTS

| | | | |
|---|---|---|---|
| 2,746,502 | 5/1956 | Graell | 150—3 |
| 3,313,470 | 4/1967 | Renner et al. | 229—54 |

FOREIGN PATENTS

| | | |
|---|---|---|
| 380,422 | 9/1964 | Switzerland. |

DONALD A. GRIFFIN, Primary Examiner

U.S. Cl. X.R.

229—54